9371X
T. Beede,
Thrashing Mach.
Patented Feb. 10. 1836.
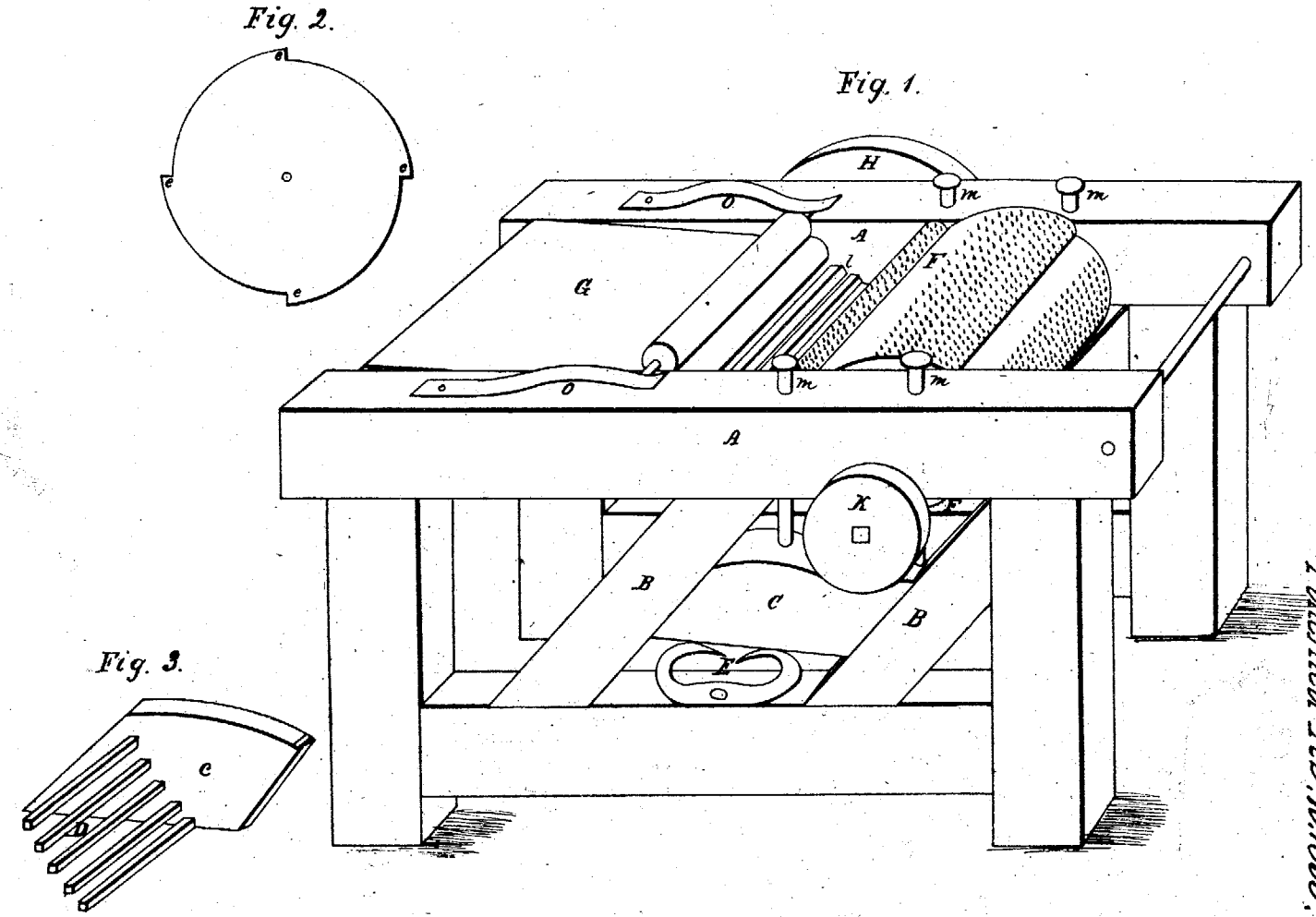

9371X  Ar. 15  Feb 10. 1836  29/.

Thomas Beede, of Sandwich, N. H.
Letters Patent

The schedule referred to in these Letters Patent and making part of the same containing a description in the words of the said Thomas Beede him-self of his improvement in the machine for thrashing grain —.

---

To all to whom these presents shall come; Be it known that I Thomas Beede of the Town of Sandwich in the County of Strafford and State of New Hampshire, have invented a new and useful improvement in a machine for thrashing grain, constructed from the idea of the effect; of a common cider mill nut, placed horizontally and revolving over a curve of iron grates back-wards — First, I make a permanent frame in the form of an oblong square from six to seven feet in length from twenty to thirty inches in width between joints & about two and a half feet high. There are attached to this frame four braces, two on each side, set at an angle of forty-five degrees about twenty inches apart and parallel to each other as at B.B. Fig. 1. in these braces are fitted cross bars loosely a little inclining as at C.C. which rests upon steel springs with a bow at each end fastened to the sills of the frame as at E. in these cross bars are fitted and fastened iron grates about an inch square, placed in a circular form about three quarters of an inch apart and occupying about one fourth part of a circle as at D. these with the cross bars constitute a curve. The top grate or bar is placed about a half inch back of the circle, in which the other bars or grates are placed — The inside of said bar is perpendicular. The inside of the remaining bars or grates are gradually inclining till it comes to the last bar which is placed hori-zontal — Second, I make a cylinder of solid wood. Fig. 2. about sixteen inches in diameter and from twenty to thirty inches in length to correspond with the width of the frame as above mentioned (The outside of said cy-linder is formed into four spherical flanges (similar to those of the com-mon cider mill nut as at e.e.e.e. Fig. 2) or more when required. these flanges are covered in part with a sheet iron grater. a small iron shaft is made to pass thro' the centre of this cylinder which forms the gudgeon 298. 9371X for the same and a pulley is fitted at each end for carrying the cylinder &c. in common form - I then place the cylinder on the frame directly within the curve fitted to boxes, as in common machinery — —

The curve is kept at any required distance from the cylinder by means of screws as at F.F. Fig.1. pressing the ends of the cross bars upon the before mentioned springs — The grain is made to pass through the machine with the inclination of the flanges & grates; or the smooth way, an apron & feeders are attached to the machine similar to that of a common picker or carding machine for drawing in the grain — -

What I claim as my own invention & not previously known in the above described machine, is in the particular construction of the cylinder with the spherical flanges, and the application of the same, to the curved and inclined grates - also the arrangement of the said bars or grates, in a curved and inclined position, as before described, also the arrangement of the springs, and placing the cross bars upon these springs, within the braces also the arrangement of the screws at the end of said bars, for the purpose of holding the curve at any required distance from the cylinder, as before described —

Thomas Beede

Witnesses
David G. Beede
Enoch R. Beede

Exd.
M.G.

Drawing

7206 F